United States Patent
Park et al.

(10) Patent No.: US 8,974,951 B2
(45) Date of Patent: Mar. 10, 2015

(54) BATTERY PACK

(75) Inventors: Hankyu Park, Suwon-si (KR); Yooseon Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 713 days.

(21) Appl. No.: 12/822,395

(22) Filed: Jun. 24, 2010

(65) Prior Publication Data

US 2011/0003193 A1    Jan. 6, 2011

(30) Foreign Application Priority Data

Jul. 1, 2009 (KR) .................. 10-2009-0059908

(51) Int. Cl.
*H01M 6/42* (2006.01)
*H01M 2/24* (2006.01)
*H01M 2/10* (2006.01)
*H01M 10/42* (2006.01)
*H01M 2/14* (2006.01)

(52) U.S. Cl.
CPC .......... *H01M 10/4207* (2013.01); *H01M 2/105* (2013.01); *H01M 2/14* (2013.01)
USPC ........... 429/159; 429/158; 429/157; 429/156; 429/149; 429/100; 429/99

(58) Field of Classification Search
None
See application file for complete search history.

(56) References Cited

U.S. PATENT DOCUMENTS

| | | | |
|---|---|---|---|
| 2003/0082439 A1* | 5/2003 | Sakakibara | 429/120 |
| 2005/0053829 A1 | 3/2005 | Han | |
| 2007/0148536 A1 | 6/2007 | Kang et al. | |
| 2007/0190405 A1* | 8/2007 | Kang et al. | 429/99 |
| 2008/0220324 A1* | 9/2008 | Phillips et al. | 429/120 |
| 2008/0286640 A1 | 11/2008 | Naito | |
| 2009/0061294 A1 | 3/2009 | Ahn | |

FOREIGN PATENT DOCUMENTS

| | | | | |
|---|---|---|---|---|
| CN | 101346832 | | 1/2009 | |
| EP | 1 309 019 A2 | | 5/2003 | |
| EP | 1309019 | | 5/2003 | |
| JP | 2003-142051 | | 5/2003 | |
| JP | 2005-056721 | | 3/2005 | |
| JP | 2005-317456 | | 11/2005 | |
| JP | 2006-134800 | * | 5/2006 | H01M 2/10 |
| JP | 2008-287989 | | 11/2008 | |
| JP | 2009-518805 | | 5/2009 | |
| KR | 10-2005-0026162 A | | 3/2005 | |
| KR | 10-2007-0075711 | | 7/2007 | |
| KR | 10-2007-0081602 | | 8/2007 | |
| KR | 10-0876265 B1 | | 12/2008 | |
| WO | WO 2007/066919 | | 6/2007 | |

OTHER PUBLICATIONS

English translation of JP 2006-134800.*

(Continued)

*Primary Examiner* — Yoshitoshi Takeuchi
(74) *Attorney, Agent, or Firm* — Knobbe Martens Olson & Bear LLP

(57) ABSTRACT

A battery pack includes a plurality of unit batteries disposed in a spacer and connected via electrode tabs in a case so as to facilitate assembly of the battery pack and to prevent movement of the unit batteries when the battery pack is used, thereby increasing performance and efficiency of manufacture of the battery pack.

11 Claims, 6 Drawing Sheets

(56) References Cited

OTHER PUBLICATIONS

Office Action dated Jul. 30, 2012 for corresponding JP Applciation No. 2010-146166.

Office Action dated Aug. 24, 2012 for corresponding CN Application No. 201010214466.3.

Korean Notice of Allowance dated Jul. 29, 2011 in Application No. 10-2009-0059908.

European Search Report dated Oct. 6, 2010 in corresponding Application No. 10167978.5.

* cited by examiner

BATTERY PACK

CROSS-REFERENCE TO RELATED APPLICATION

This application claims the benefit of Korean Patent Application No. 10-2009-0059908, filed on Jul. 1, 2009, in the Korean Intellectual Property Office, the disclosure of which is incorporated herein by reference.

BACKGROUND OF THE INVENTION

1. Field of the Invention

Aspects of the invention relate to a battery pack, and more particularly, to a high power and high capacity battery pack including a plurality of unit batteries.

2. Description of the Related Art

Secondary batteries, unlike primary batteries, are rechargeable. Low capacity secondary batteries are used in small portable electronic devices, such as phones, notebook computers, and camcorders. High capacity secondary batteries are widely used as motor-driving power sources for hybrid vehicles. Such secondary batteries include cylinder type batteries and prismatic type batteries. A plurality of high power secondary batteries are connected in series to constitute a high capacity secondary battery, which is necessary to drive a motor of a device requiring high capacity, for example, a motor of an electric vehicle.

As such, a single high capacity secondary battery, i.e., a battery module, includes a plurality of unit batteries connected in series and/or in parallel. Each of the unit batteries includes an electrode assembly including a positive electrode plate and a negative electrode plate with a separator therebetween; a case in which the electrode assembly is disposed; a cap assembly coupled to the case to close the case; and positive and negative terminals that protrude from the cap assembly and are connected electrically to collectors of the positive and negative electrode plates of the electrode assembly. Thus, the unit batteries of the battery module are spaced apart from each other and connected in series and/or in parallel through electrode tabs. The battery module is inserted into a spacer to space the unit batteries apart from each other. Finally, the battery module is electrically connected to a protection circuit board and disposed in an outer case to provide a completed battery pack.

After being disposed in the outer case, the battery module of the battery pack may move in the outer case due to an external shock, so that the unit batteries may disconnect from each other or the protection circuit board. In an attempt to prevent such disconnection, a discrete gap prevention member is generally provided between the battery module and inner sidewalls of the outer case to prevent the battery module from moving in the outer case. However, since the discrete gap prevention member is added to the battery pack, manufacturing costs are increased. In addition, since it is difficult to assemble the discrete gap prevention member and the battery pack, productivity is decreased.

Alternatively, a discrete inner case may envelop the battery module and then be disposed in the outer case. However, since the battery pack still has a gap between the added inner case and the inner sidewalls of the outer case, it is difficult to prevent movement of the battery module.

SUMMARY OF THE INVENTION

Aspects of the invention provide a battery pack including a plurality of unit batteries; a spacer in which the unit batteries are disposed; an electrode tab that electrically connects at least two of the unit batteries to each other; a case in which the unit batteries and the spacer are disposed; and a gap prevention rib disposed on an inner wall of the case to correspond to the spacer.

According to aspects of the invention, the unit batteries may be cylinder type batteries arranged in a multi-layer structure, and adjacent unit batteries in each of the layers may have opposite polarities.

According to aspects of the invention, the spacer may include a body having a plate shape having seat surfaces that correspond to outer surfaces of the unit batteries; and partition walls disposed between the seat surfaces, the partition walls including heat diffusion recesses.

According to aspects of the invention, the spacer may include a lead wire hole that extends in a longitudinal direction of the spacer, the longitudinal direction being parallel to a length of the unit batteries.

According to aspects of the invention, the spacer may include stop ribs alternately disposed at both sides of the spacer to prevent movement of the unit batteries disposed on the spacer.

According to aspects of the invention, the spacer may be formed of a soft plastic.

According to aspects of the invention, the soft plastic may include at least one of polyethylene (PE), polypropylene (PP), polyvinyl chloride (PVC), polystyrene (CPS), polyethylene terephthalate (PETE), and/or equivalents thereof.

According to aspects of the invention, the case may include a bottom case in which the unit batteries and the spacer are disposed, and a top case that closes the bottom case, and the gap prevention rib may be disposed on an inner surface of a sidewall of the bottom case.

According to aspects of the invention, the bottom case may include a bottom plate; and sidewalls inclined outward in an upward direction from the bottom plate, wherein an upper part of the gap prevention rib disposed away from the bottom plate may protrude from one of the sidewalls more than a lower part of the gap prevention rib disposed adjacent to the bottom plate.

According to aspects of the invention, an upper part of the gap prevention rib may protrude about 1.656 mm from the one of the sidewalls, and the lower part of the gap prevention rib may protrude about 0.992 mm from the one of the sidewalls.

According to aspects of the invention, the bottom case may include a bottom plate having seat recess parts, the seat recess parts may have a semicircular cross-section, and the unit batteries may be disposed on the seat recess parts.

Aspects of the invention provide a battery pack including a plurality of unit batteries; a spacer in which the unit batteries are disposed; an electrode tab that electrically connects at least two of the unit batteries to each other; a case in which the unit batteries and the spacer are disposed; and a gap prevention rib disposed on an inner wall of the case to correspond to the electrode tab.

According to aspects of the invention, the spacer may include a body having a plate shape with seat surfaces to correspond to outer surfaces of the unit batteries; and partition walls disposed between the seat surfaces, the partition walls including heat diffusion recesses.

According to aspects of the invention, the spacer may include a lead wire hole that is disposed in a longitudinal direction of the spacer, the longitudinal direction being parallel to a length of the unit batteries.

According to aspects of the invention, the spacer may include stop ribs alternately disposed at both sides of the spacer to prevent movement of the unit batteries disposed on seat surfaces of the spacer.

According to aspects of the invention, the spacer may be formed of a soft plastic.

According to aspects of the invention, the electrode tab may include a contact welded to at least one of the unit batteries, and a lead wire connection connected to a lead wire.

According to aspects of the invention, the case may include a bottom case in which the unit battery and the spacer are disposed, and a top case that closes the bottom case, and the gap prevention rib may be disposed at an inner surface of a sidewall of the bottom case.

According to aspects of the invention, the bottom case may include a bottom plate; and sidewalls inclined outward in an upward direction from the bottom plate, wherein an upper part of the gap prevention rib disposed away from the bottom plate may protrude from the sidewall more than a lower part of the gap prevention rib disposed adjacent to the bottom plate.

According to aspects of the invention, the battery pack may further include an insulation tape disposed between the electrode tab and the case to protect the electrode tab.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
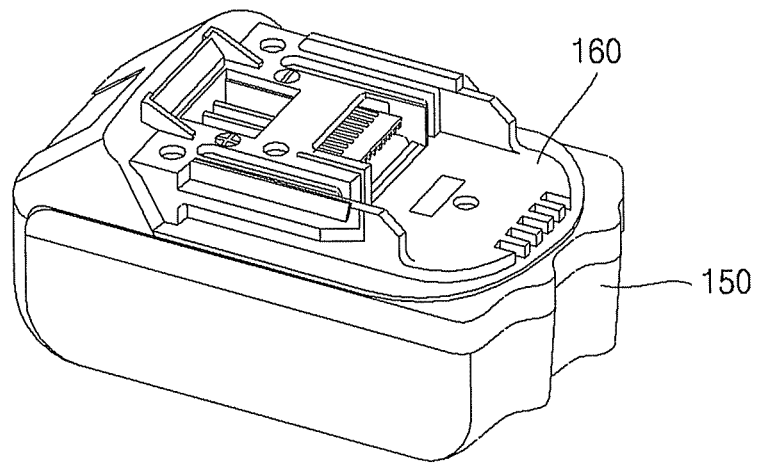
FIG. 1 illustrates a perspective view of a battery pack according to an aspect of the invention.

Reference will now be made in detail to embodiments of the invention, examples of which are illustrated in the accompanying drawings, wherein like reference numerals refer to the like elements throughout. The embodiments are described below in order to explain the invention by referring to the figures.

Figure 2:
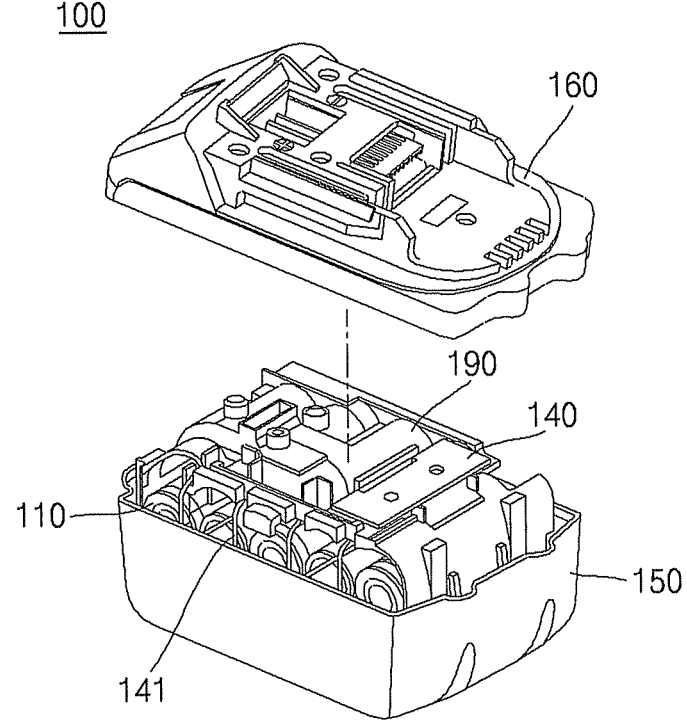
FIG. 2 illustrates a schematic view of the battery pack of FIG. 1 in which a top case has been removed.
Figure 3:
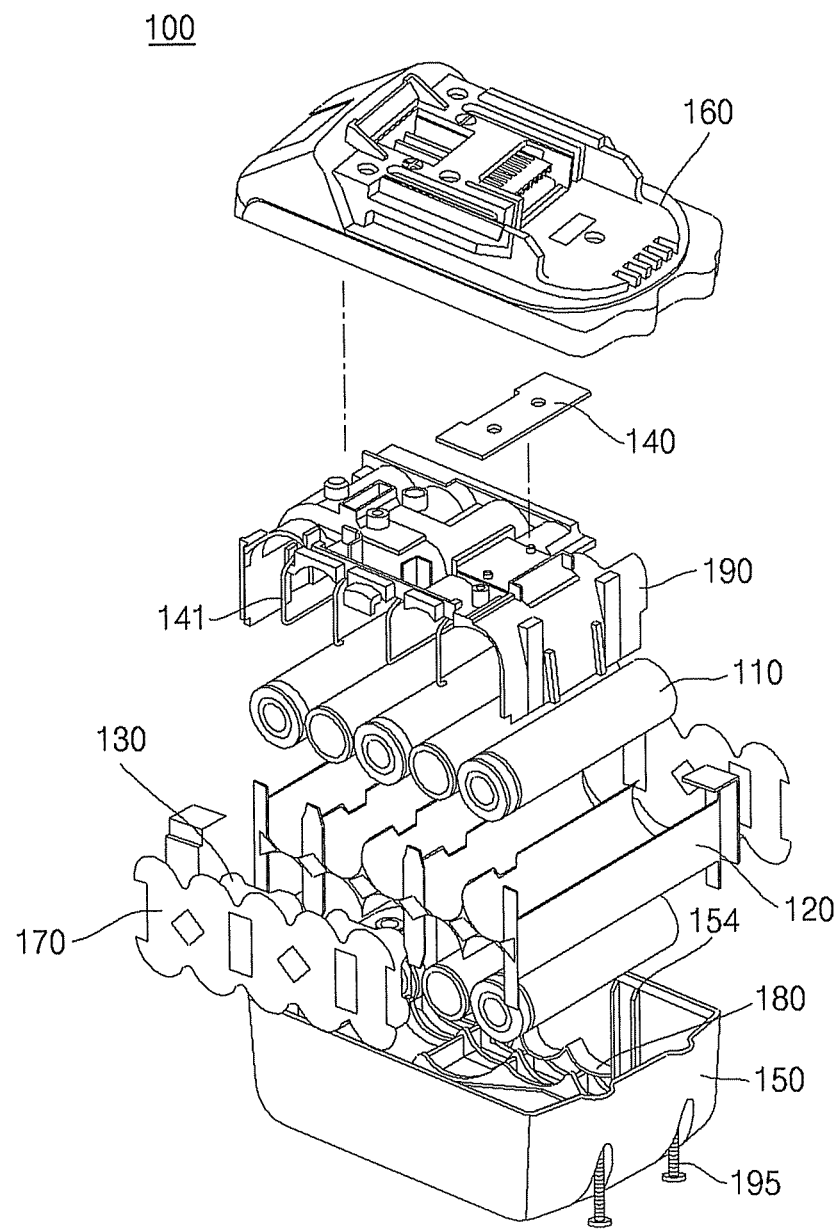
FIG. 3 illustrates an exploded perspective view of the battery pack of FIG. 1.
Figure 4:
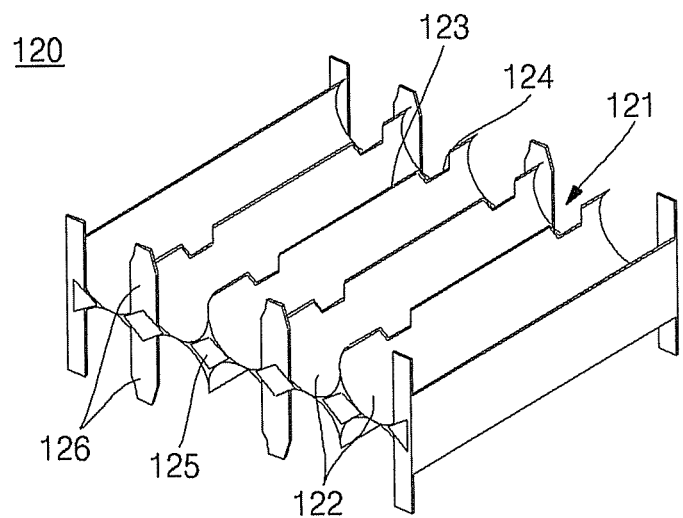
FIG. 4 illustrates a perspective view of the spacer of FIG. 3.
Figure 5:
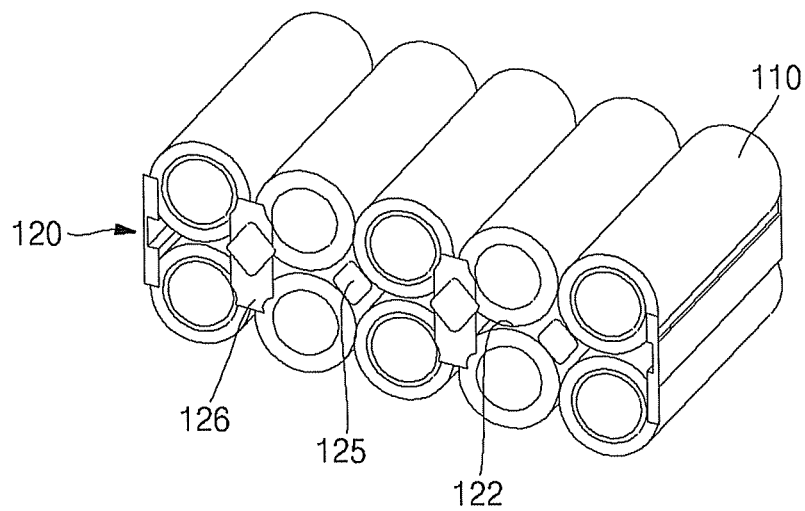
FIG. 5 illustrates a schematic view of the spacer of FIG. 4 in which unit batteries are disposed.
Figure 6:
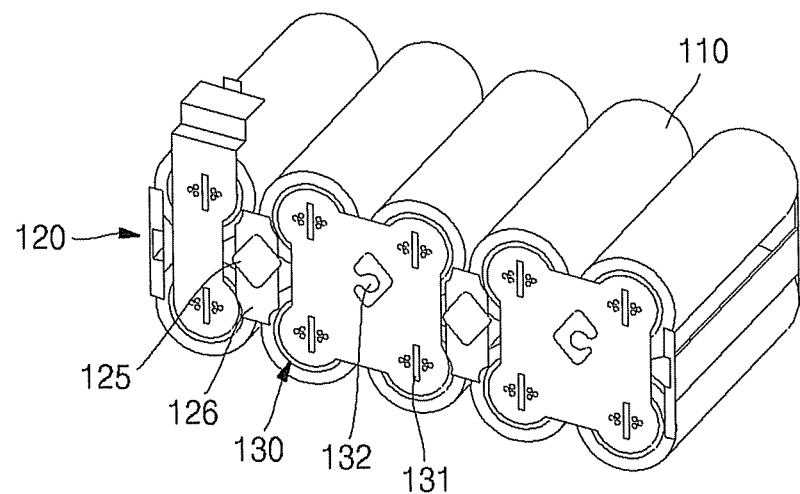
FIG. 6 illustrates a schematic view of electrode tabs coupled to the unit batteries of FIG. 5.
Figure 7:
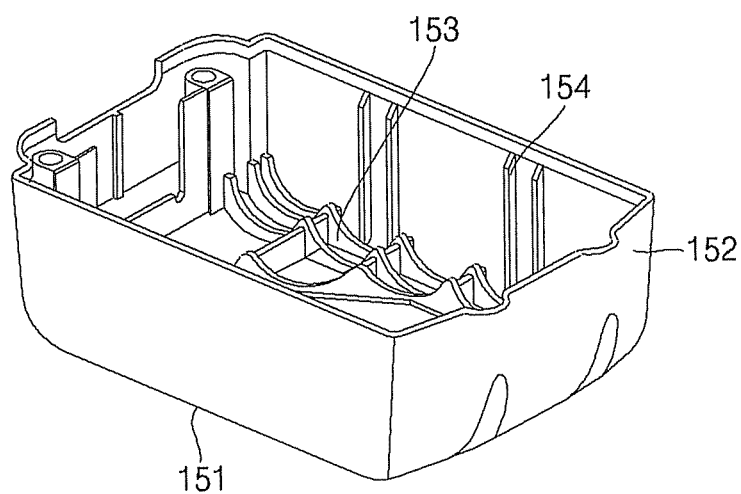
FIG. 7 illustrates a perspective view of the bottom case of FIG. 2.
Figure 8:
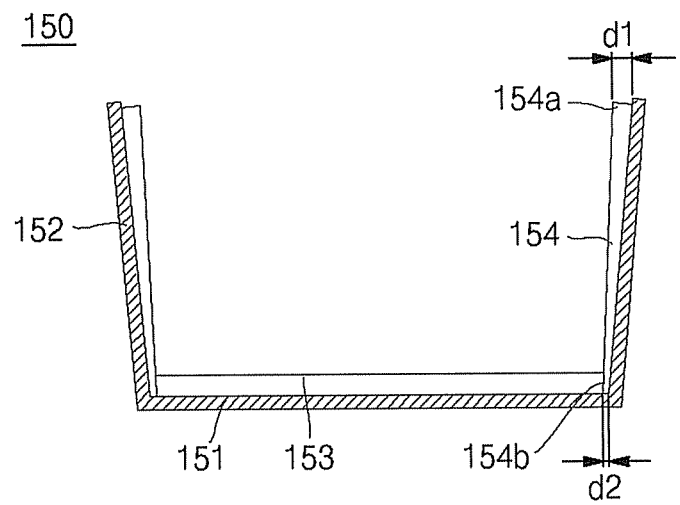
FIG. 8 illustrates a cross-sectional view of the bottom case of FIG. 7.
Figure 9:
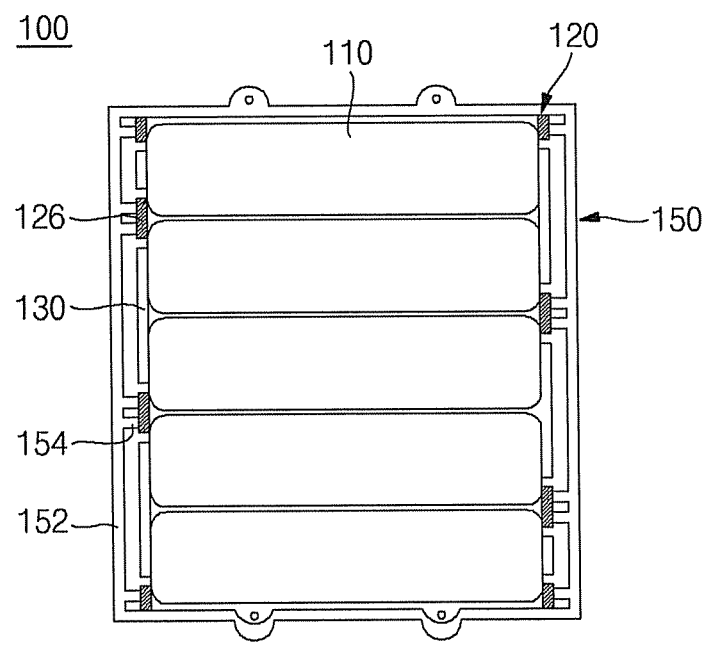
FIG. 9 illustrates a plan view of a bottom portion of the battery pack of FIG. 1.

FIG. 1 illustrates a perspective view of a battery pack according to aspects of the invention. FIG. 2 illustrates a schematic view of the battery pack of FIG. 1 in which a top case has been removed. FIG. 3 illustrates an exploded perspective view of the battery pack of FIG. 1. FIG. 4 illustrates a perspective view of the spacer of FIG. 3. FIG. 5 illustrates a schematic view of the spacer of FIG. 4 in which unit batteries are disposed. FIG. 6 illustrates a schematic view of electrode tabs coupled to the unit batteries of FIG. 5. FIG. 7 illustrates a perspective view of the bottom case of FIG. 2. FIG. 8 illustrates a cross-sectional view of the bottom case of FIG. 7. FIG. 9 illustrates a plan view of a bottom portion of the battery pack of FIG. 1.

As illustrated in FIGS. 1 to 9, a battery pack 100 according to aspects of the invention includes a plurality of unit batteries 110, a spacer 120 that separates the unit batteries 110 from each other, electrode tabs 130 to connect the unit batteries 110 in series and/or in parallel, and a case in which the unit batteries 110, the spacer 120, and the electrode tabs 130 are disposed. The case houses the unit batteries 110, the spacer 120, and the electrode tabs 130. An inner wall of the case is provided with gap prevention ribs 154 that correspond to the spacer 120.

The battery pack 100 further includes a protection circuit board 140 to protect the unit batteries 110 from being over-discharged or over-charged, and lead wires 141 to electrically connect the unit batteries 110 to the protection circuit board 140.

The battery pack 100 further includes an insulation tape 170 disposed on the outer surfaces of the electrode tabs 130, a cushion tape 180 disposed on a lower surface of the case, and a holder 190 coupled to the upper portions of the unit batteries 110. The protection circuit board 140 is disposed on the holder 190.

The unit batteries 110 are cylinder type batteries; however, aspects of the invention are not limited thereto, such that the unit batteries 110 may be prismatic type batteries or batteries of other shapes. Five unit batteries 110 are arranged in series and/or in parallel, and two groups of the five unit batteries 110 are arranged in two layers. However, aspects of the invention are not limited thereto, such that more or fewer unit batteries 110 may be arranged in more or fewer layers; for example, seven unit batteries 110 may be arranged in each of four layers. The adjacent unit batteries 110 in each of the layers have different polarities. That is, when an end of one of the adjacent unit batteries 110 has the positive pole (+), an adjacent unit battery 110 in the same layer is disposed such that an end of the adjacent battery 110 has the negative pole (−).

As shown in FIG. 4, the spacer 120 includes a spacer body 121 having a plate shape that is provided with semicircular seat surfaces 122 corresponding to the outer surfaces of the cylinder type unit batteries 110. However, aspects of the invention are not limited thereto, such that the seat surfaces 122 may be of other shapes so as to accommodate unit batteries 110 having different shapes, for example, prismatic type unit batteries. Five seat surfaces 122 are provided to each of the upper and lower surfaces of the spacer body 121 so that two layers of unit batteries 110 may be disposed in the spacer 120. However, aspects of the invention are not limited thereto, such that the spacer 120 may include more or fewer seat surfaces 122 to respectively accommodate more or fewer unit batteries 110. Partition walls 123 are disposed between the seat surfaces 122. The partition walls 123 are provided with heat diffusion recesses 124. For purposes of reference and not to be limiting, the poles of the unit batteries 110 are disposed at "sides" of the spacer 120, while the surfaces of the spacer 120 parallel to the longitudinal direction of the unit batteries 110 and the partition walls 123 are the "ends" of the spacer 120.

Lead wire holes 125 pass through the spacer 120 in the longitudinal direction of the spacer body 121, i.e., in a direction parallel to a longitudinal direction of the unit batteries 110. Each of lead wire holes 125 is disposed between the two seat surfaces 122 disposed in the upper layer and the two seat surfaces 122 disposed in the lower layer. For example, four lead wire holes 125 are shown in FIG. 4. However, when the spacer 120 includes more or fewer seat surfaces 122, the number of lead wire holes 125 may be increased or decreased accordingly.

Both sides of the spacer body 121 are provided with stop ribs 126 that prevent movement of the unit batteries 110, i.e., the stop ribs 126 are disposed adjacent to the poles of the unit batteries 110. The stop ribs 126 are provided to at least one end of the seat surface 122. Thus, the stop ribs 126 prevent the unit batteries 110 from being removed from the seat surfaces 122 in a longitudinal direction with respect to the spacer 120, i.e., in a same direction as the direction of the lead wire holes 125. The stop ribs 126 are disposed on the upper and lower sides of the lead wire holes 125. The stop ribs 126 may be alternately provided to a first side and a second side of the seat surface 122 such that, although the stop ribs 126 are not provided at the end of each seat surface 122 along both the first and second sides of the spacer 120, movement and removal of the unit batteries 110 can be prevented. Accordingly, since the stop ribs 126 may be disposed alternately to both sides of the spacer 120, the stop ribs 126 do not interfere with the electrode tabs 130 when the electrode tabs 130 are welded to the unit batteries 110.

The spacer 120 may be formed of soft plastic that includes at least one of polyethylene (PE), polypropylene (PP), polyvinyl chloride (PVC), polystyrene (CPS), polyethylene terephthalate (PETE), and/or equivalents thereof. The soft plastic absorbs shock and supports and protects the unit batteries 110.

The electrode tab 130 connects two or four adjacent unit batteries 110 in series and/or in parallel. The electrode tab 130 is disposed on the sides of the spacer 120 to connect unit batteries 110 on both the upper and lower layers of the spacer 120. When connecting four adjacent unit batteries 110, four corners of the electrode tab 130 include contacts 131 that are welded to the positive poles (+) or the negative poles (−) of the unit batteries 110. When connecting only two adjacent unit batteries 110, each end of the electrode tab 130 includes contacts 131 that are welded to the positive poles (+) or the negative poles (−) of the unit batteries 110. Further, the electrode tab 130 may be plurally provided to connect unit batteries 110 disposed in the spacer 120 in plural layers so that adjacent unit batteries 110 of different layers are connected in parallel and adjacent unit batteries 110 of a same layer are connected in series; however, aspects of the invention are not limited thereto, such that the plural electrode tabs 130 may connect the unit batteries 110 in series and/or in parallel in any arrangement. The center of the electrode tab 130 is provided with a lead wire connection 132 that supports the lead wire 141 passing there-through. The electrode tabs 130 may be formed of metal having a high conductivity, which includes at least one of nickel, aluminum, copper, and silver, but aspects are not limited thereto, such that the electrode tabs 130 may be formed of other materials and may include multiple layers, at least one of which has a high conductivity.

The protection circuit board 140 may include a protection circuit (not shown) or an electric device (not shown) that protects the unit batteries 110 from over-discharging or over-charging.

The lead wires 141 extend from the protection circuit board 140 to connect the protection circuit board 140 to the unit batteries 110, i.e., the lead wires 141 may connect the protection circuit or the electric device of the protection circuit board 140 to the unit batteries 110. The lead wires 141 pass through the lead wire holes 125 of the spacer 120 and are fixed to the lead wire connections 132 of the electrode tabs 130.

The case includes a bottom case 150 in which the unit batteries 110, the spacer 120, the electrode tabs 130, and the protection circuit board 140 are disposed; and a top case 160 that closes an open upper part of the bottom case 150. The bottom case 150 includes a bottom plate 151 and four sidewalls 152 that extend upward from edges of the bottom plate 151.

The upper surface of the bottom plate 151 includes a plurality of seat recess parts 153 on which the unit batteries 110 are placed. As shown in FIG. 7, the seat recess parts 153 have a semicircular cross-section which corresponds to the shape of the unit batteries 110; however, aspects of the invention are not limited thereto, such that the seat recess parts 153 may have other shapes, for example, to correspond to prismatic type unit batteries. The seat recess parts 153 may be arrayed in a lattice at the bottom plate 151 which corresponds to the unit batteries 110 disposed in the spacer 120.

As shown in FIG. 9, gap prevention ribs 154 are disposed on the inner surfaces of the sidewalls 152. The gap prevention ribs 154 correspond to the spacer 120. Thus, the gap prevention ribs 154 are vertically disposed on the inner wall of the case. A pair of the gap prevention ribs 154 that are parallel to each other is disposed in a region that corresponds to the spacer 120, and the gap prevention ribs 154 may be disposed to correspond to the spacer 120 so that the gap prevention ribs 154 are arranged to align with the stop ribs 126 of the spacer 120.

As shown in FIG. 8, the sidewalls 152 are inclined from the bottom plate 151. That is, the sidewalls 152 are inclined outward in the upward direction from the bottom plate 151. Thus, the upper part of the gap prevention ribs 154 may protrude more than the lower part thereof. For example, a bottom end 154b of the gap prevention rib 154 may have a protruding length d2 of about 0.992 mm, and a top end 154a of the gap prevention rib 154 may have a protruding length d1 of about 1.656 mm. In other words, a protruding ratio of the top end 154a to the bottom end 154b may be about 3:2. However, the protruding ratio is not limited thereto, and the upper and lower protruding lengths of the gap prevention ribs 154 may be varied according to an inclined amount of the sidewalls 152 from the bottom plate 151. As such, the upper part of the gap prevention ribs 154 protrudes more than the lower part thereof to support the spacer 120 without a gap.

As shown in FIGS. 1-3, the top case 160 has a shape and a size for closing the open upper part of the bottom case 150. Thus, the top case 160 has a plate shape to cover the bottom case 150 that has an approximate box shape.

The insulation tape 170 is attached between the electrode tabs 130 and the bottom case 150 to protect the electrode tabs 130. The cushion tape 180 is disposed in the bottom case 150. The cushion tape 180 absorbs shock from the bottom plate 151 to protect the unit batteries 110, and the cushion tape 180 is disposed on the upper surface of the bottom plate 151.

The holder 190 envelops the upper and side surfaces of the unit batteries 110 disposed in the spacer 120 to protect the unit batteries 110 from external shock, i.e., the holder 190 is disposed about top surfaces of the battery units 110 disposed in the spacer 120 and end surfaces of the spacer 120 parallel to the partition walls 123.

A method of assembling a battery pack configured as described above will now be described according to aspects of the invention. First, the unit batteries 110 are placed on the seat surfaces 122 of the spacer 120 such that the adjacent unit batteries 110 have reverse polarities. However, aspects of the invention are not limited thereto, such that the adjacent unit batteries 110 may have the same polarities and may be arranged in series and/or in parallel. The heat diffusion recesses 124 are provided to the partition walls 123 between the seat surfaces 122 to diffuse heat generated from the unit batteries 110 to the outside. The stop ribs 126, alternately disposed along the sides of the spacer body 121, prevent the unit batteries 110 from being removed from the spacer 120. The stop ribs 126 support both ends of the unit batteries 110 to prevent the unit batteries 110 from being moved by external shock.

The electrode tabs 130 are welded to both ends of at least two (or four) of the unit batteries 110, respectively. Thus, the unit batteries 110 to which the electrode tabs 130 are welded are connected to each other in series and/or in parallel.

The insulation tape 170 is attached to the outer surfaces of the electrode tabs 130. The insulation tape 170 has a shape corresponding to the electrode tabs 130 to protect the electrode tabs 130.

The upper parts of the unit batteries 110 are coupled to the holder 190 that envelops the upper and side surfaces of the unit batteries 110.

The upper surface of the holder 190 is provided with the protection circuit board 140 out of which the lead wires 141 extend. The lead wires 141 are connected to the unit batteries 110. The lead wires 141 pass through the lead wire holes 125 of the spacer 120 and are fixed to the lead wire connections 132 provided to the electrode tabs 130. Thus, the lead wires 141 extend out from the protection circuit board 140 and are connected to the electrode tabs 130 welded to the unit batteries 110.

The unit batteries 110 placed on the spacer 120 and connected to the electrode tabs 130 and the protection circuit board 140 disposed on the holder 190, i.e., a battery module, is then disposed in the bottom case 150. Since the battery module is disposed on the cushion tape 180 above the bottom plate 151 of the bottom case 150, the battery module is protected from colliding with the bottom plate 151.

The lower surfaces of the unit batteries 110 of the battery module are not enveloped by the holder 190 and are placed respectively on the seat recess parts 153 disposed on the upper surface of the bottom plate 151 of the bottom case 150. The spacer 120 is in close contact with the gap prevention ribs 154 provided to the sidewalls 152 of the bottom case 150. The gap prevention ribs 154, in contact with the stop ribs 126 of the spacer body 121 of the spacer 120, correspond to both sides of the spacer 120. That is, the gap prevention ribs 154 support the spacer 120, and the stop ribs 126 prevent movement of the unit batteries 110 placed on the spacer 120. Thus, the gap prevention ribs 154 prevent movement of the unit batteries 110 placed on the spacer 120. Particularly, since the top end 154*a* protrudes more than the bottom end 154*b*, even when the sidewalls 152 of the bottom case 150 are inclined outward, the gap prevention ribs 154 are in close contact with the spacer 120. Finally, the top case 160 is coupled to the upper part of the bottom case 150 via screws 195 to complete the assembling of the battery pack 100. However, aspects of the invention are not limited thereto, such that the top case 160 and bottom case 150 may be coupled by other arrangements, such as pins, adhesives, tapes, latches, or other connectors.

Figure 10:
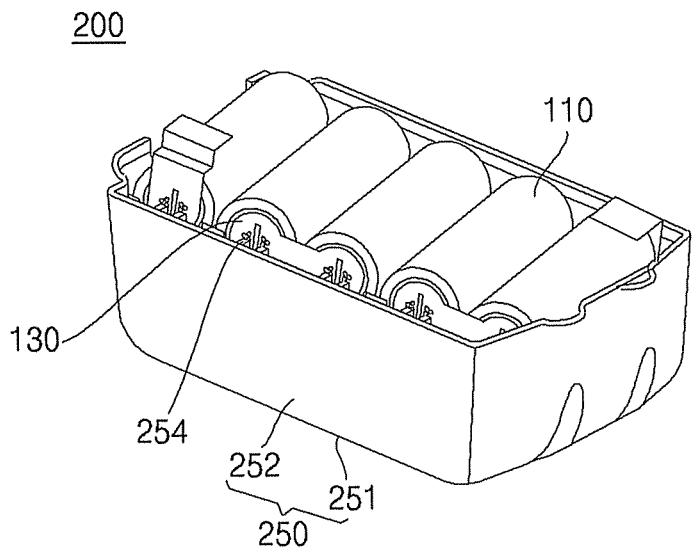
FIG. 10 illustrates a perspective view of a bottom portion of a battery pack according to aspects of the invention.
Figure 11:
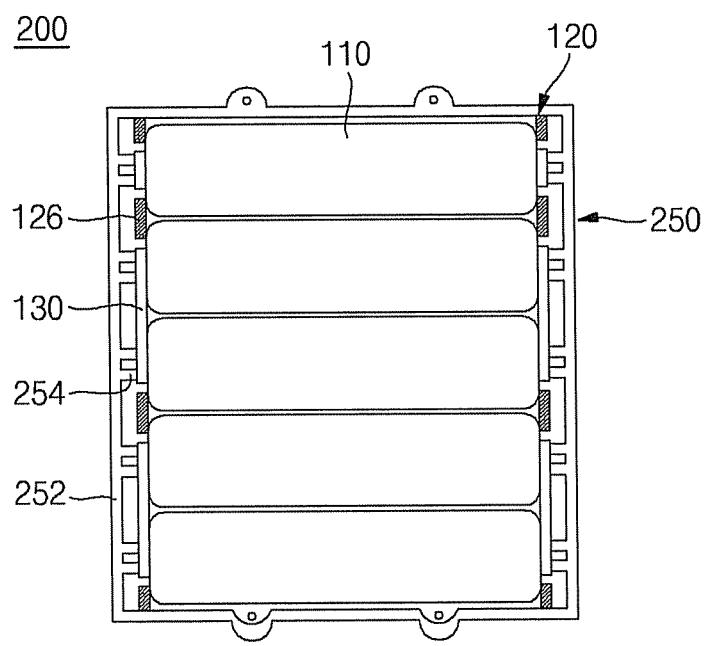
FIG. 11 illustrates a plan view of the bottom portion of the battery pack of FIG. 10.

Hereinafter, a battery pack according to aspects of the invention will now be described with reference to FIGS. 10 and 11. FIG. 10 illustrates a perspective view of a battery pack according to aspects of the invention. FIG. 11 illustrates a plan view of a bottom portion of the battery pack of FIG. 10.

As illustrated in FIGS. 10 and 11, a battery pack 200 includes the unit batteries 110, the spacer 120 that separates the unit batteries 110 from each other, the electrode tabs 130 that connect the unit batteries 110 in series and/or in parallel, and a bottom case in which the unit batteries 110, the spacer 120, and the electrode tabs 130 are disposed. The inner wall of the case is provided with gap prevention ribs 254 corresponding to the electrode tabs 130.

The battery pack 200 further includes a protection circuit board (not shown) that protects the unit batteries 110 from over-discharging or over-charging, an insulation tape (not shown) attached to the outer surfaces of the electrode tabs 130, a cushion tape (not shown) provided to the lower surface of the case, a holder (not shown) coupled to the upper parts of the unit batteries 110 and provided with the protection circuit board (not shown), and a top case (not shown) that closes the bottom case 250. Since the battery pack 200 is the generally same as the battery pack 100 except for the bottom case 250 that includes the gap prevention ribs 254 that support the electrode tabs 130, like reference numerals denote like elements, and a detailed description thereof will be omitted.

The battery pack 200 includes the bottom case 250 in which the unit batteries 110, the spacer 120, and the electrode tabs 130 are disposed.

The bottom case 250 includes a bottom plate 251 and four sidewalls 252 that extend upward from edges of the bottom plate 251. The inner surfaces of the sidewalls 252 are provided with the gap prevention ribs 254.

As shown in FIG. 11, the gap prevention ribs 254 are disposed at positions that correspond to the electrode tabs 130 on the sidewalls 252. Thus, the gap prevention ribs 254 are vertically disposed on the inner surfaces of the sidewalls 252, and pairs of the gap prevention ribs 254 that are parallel to each other are disposed in regions that correspond to the electrode tabs 130, i.e., the gap prevention ribs 254 are disposed to align with the electrode tabs 130.

A method of assembling the battery pack 200 is the same as that of the battery pack 100. In the battery pack 200, when the unit batteries 110 are disposed in the bottom case 250, the gap prevention ribs 254 support the electrode tabs 130 welded to the unit batteries 110. Thus, the state where the electrode tabs 130 are welded to the unit batteries 110 is maintained. Furthermore, the gap prevention ribs 254 prevent movement of the unit batteries 110.

According to the aspects of the invention as described above, the gap prevention ribs disposed on sidewalls of the bottom case support only the spacer, or only the electrode tabs. However, it will be appreciated that the spacer and the electrode tabs may be simultaneously supported by the gap prevention ribs.

According to the aspects of the invention, a high capacity and high power battery pack includes a case in which a plurality of unit batteries are disposed and gap prevention ribs are brought in close contact with a spacer and/or electrode tabs to minimize movement of the unit batteries due to external shock, thereby preventing malfunction of the unit batteries to improve reliability of a product including the battery pack.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A battery pack comprising:
   a plurality of unit batteries having ends and side walls;
   a spacer disposed between the unit batteries so as to be interposed between the side walls of the plurality of unit batteries along the length of the unit batteries, the spacer having a plurality of surfaces that are located adjacent the ends of the batteries wherein the spacer has a first and a second end and an enclosed lead wire hole that extends between the first and the second end;
   an electrode tab that electrically connects at least two of the unit batteries to each other;
   a case in which the unit batteries and the spacer are disposed;
   a plurality of gap prevention ribs disposed on an inner wall of the case so as to extend outward from the inner wall of the case a distance sufficient to be respectively positioned proximate the plurality of surfaces so as to make contact with the plurality of surfaces to inhibit movement of the spacer within the case; and
   at least one lead wire attached to the electrode tab that extends from the first to the second end of the spacer in the enclosed lead wire hole of the spacer.

2. The battery pack of claim 1, wherein the unit batteries are cylinder type batteries arranged in a multi-layer structure, and adjacent unit batteries in each of the layers have opposite polarities.

3. The battery pack of claim 1, wherein the spacer comprises:
   a body having a plate shape having seat surfaces that correspond to outer surfaces of the unit batteries; and
   partition walls disposed between the seat surfaces, the partition walls including heat diffusion recesses.

4. The battery pack of claim 1, wherein the spacer comprises a lead wire hole that extends in a longitudinal direction of the spacer, the longitudinal direction being parallel to a length of the unit batteries.

5. The battery pack of claim 1, wherein the spacer comprises stop ribs alternately disposed at both sides of the spacer to prevent movement of the unit batteries disposed in the spacer and wherein the stop ribs comprise the plurality of surfaces.

6. The battery pack of claim 1, wherein the spacer is formed of a plastic.

7. The battery pack of claim 6, wherein the plastic comprises at least one of polyethylene (PE), polypropylene (PP), polyvinyl chloride (PVC), polystyrene (CPS), polyethylene terephthalate (PETE).

8. The battery pack of claim 5, wherein the case comprises:
   a bottom case in which the unit batteries and the spacer are disposed; a top case that closes the bottom case; and
   gap prevention ribs arranged on an inner wall of the bottom case to align with the alternately disposed stop ribs of the spacer.

9. The battery pack of claim 8, wherein the bottom case comprises:
   a bottom plate; and
   sidewalls inclined outward in an upward direction from the bottom plate;
   wherein an upper part of the gap prevention rib disposed away from the bottom plate protrudes from one of the sidewalls more than a lower part of the gap prevention rib disposed adjacent to the bottom plate.

10. The battery pack of claim 9, wherein the upper part of the gap prevention rib protrudes about 1.656 mm from the one of the sidewalls, and the lower part of the gap prevention rib protrudes about 0.992 mm from the one of the sidewalls.

11. The battery pack of claim 8, wherein the bottom case comprises:
    a bottom plate having seat recess parts, the seat recess parts having a semicircular cross-section;
    wherein the unit batteries are disposed on the seat recess parts.

* * * * *